(12) United States Patent
Lewis

(10) Patent No.: US 8,381,403 B2
(45) Date of Patent: Feb. 26, 2013

(54) BAFFLE FOR AN AUTOMOTIVE VEHICLE AND METHOD OF USE THEREFOR

(75) Inventor: Keith Lewis, Macomb Township, MI (US)

(73) Assignee: Zephyros, Inc., Romeo, MI (US)

( * ) Notice: Subject to any disclaimer, the term of this patent is extended or adjusted under 35 U.S.C. 154(b) by 1153 days.

(21) Appl. No.: 11/940,613

(22) Filed: Nov. 15, 2007

(65) Prior Publication Data

US 2008/0111394 A1 May 15, 2008

Related U.S. Application Data

(63) Continuation-in-part of application No. 11/136,742, filed on May 25, 2005, now Pat. No. 7,428,774.

(51) Int. Cl.
*B21D 53/88* (2006.01)
*B29C 44/12* (2006.01)

(52) U.S. Cl. .................. 29/897.2; 29/525.13; 264/45.3; 264/46.5

(58) Field of Classification Search ............... 29/525.13, 29/897.2; 156/78, 79; 264/45.3, 45.5, 46.5; 296/33, 187.02
See application file for complete search history.

(56) References Cited

U.S. PATENT DOCUMENTS

| | | | |
|---|---|---|---|
| 2,192,075 A | 2/1940 | Albert | |
| 2,765,267 A | 10/1956 | Dorst | |
| 2,938,839 A | 5/1960 | Fahnoe et al. | |
| 3,769,813 A | 11/1973 | Okada | |
| 4,128,069 A | 12/1978 | Kotcharian | |
| 4,269,890 A | 5/1981 | Breitling et al. | |
| 4,378,394 A | 3/1983 | Miura et al. | |
| 4,391,384 A | 7/1983 | Moore et al. | |
| 4,463,870 A | 8/1984 | Coburn, Jr. et al. | |
| 4,560,523 A | 12/1985 | Plumley et al. | |
| 4,810,548 A | 3/1989 | Ligon, Sr. et al. | |
| 4,822,011 A | 4/1989 | Goldbach et al. | |
| 4,852,754 A | 8/1989 | Holdsworth et al. | |
| 4,860,820 A | 8/1989 | Pereira | |
| 4,995,545 A | 2/1991 | Wycech | |
| 5,061,418 A | 10/1991 | Ware | |
| 5,314,280 A | 5/1994 | Gagliardi et al. | |
| 5,344,208 A | 9/1994 | Bien et al. | |
| 5,358,397 A | 10/1994 | Ligon et al. | |
| 5,474,721 A | 12/1995 | Stevens | |
| 5,501,266 A | 3/1996 | Wang et al. | |
| 5,506,025 A | 4/1996 | Otto et al. | |
| 5,554,271 A | 9/1996 | Illston et al. | |
| 5,605,717 A | 2/1997 | Simmons et al. | |
| 5,631,027 A | 5/1997 | Takabatake | |
| 5,642,914 A | 7/1997 | Takabatake | |
| 5,725,272 A | 3/1998 | Jones | |

(Continued)

FOREIGN PATENT DOCUMENTS

DE 0 383 86 55 A1 5/1990
DE 38 38 655 A1 5/1990

(Continued)

OTHER PUBLICATIONS

Lilley et al., Comparison of Preformed Acoustic Baffles and Two-Component Polyurethane Forms for Filling Body Cavities.

(Continued)

*Primary Examiner* — Alexander P Taousakis
(74) *Attorney, Agent, or Firm* — Dobrusin & Thennisch PC

(57) ABSTRACT

There is disclosed a baffle for inhibiting the passage of sound, debris or the like through a cavity of an automotive vehicle.

15 Claims, 8 Drawing Sheets

U.S. PATENT DOCUMENTS

| | | | |
|---|---|---|---|
| 5,755,486 A | 5/1998 | Wycech | |
| 5,766,719 A | 6/1998 | Rimkus | |
| 5,806,915 A | 9/1998 | Takabatake | |
| 5,806,919 A | 9/1998 | Davies | |
| 5,884,960 A | 3/1999 | Wycech | |
| 5,904,024 A | 5/1999 | Miwa | |
| 5,906,410 A | 5/1999 | Dalinkiewicz | |
| 5,931,474 A | 8/1999 | Chang et al. | |
| 5,992,923 A * | 11/1999 | Wycech | 296/187.02 |
| 6,093,358 A | 7/2000 | Schiewe et al. | |
| 6,099,948 A | 8/2000 | Paver, Jr. | |
| 6,103,341 A | 8/2000 | Barz et al. | |
| 6,103,641 A | 8/2000 | Gehring, Jr. | |
| 6,129,410 A | 10/2000 | Kosaraju et al. | |
| 6,136,732 A | 10/2000 | Patel | |
| 6,146,565 A | 11/2000 | Keller | |
| 6,150,428 A | 11/2000 | Hanley, IV et al. | |
| 6,165,588 A | 12/2000 | Wycech | |
| 6,203,096 B1 | 3/2001 | Noda et al. | |
| 6,233,826 B1 | 5/2001 | Wycech | |
| 6,237,304 B1 | 5/2001 | Wycech | |
| 6,247,287 B1 | 6/2001 | Takabatake | |
| 6,253,524 B1 | 7/2001 | Hopton et al. | |
| 6,254,488 B1 | 7/2001 | Hill | |
| 6,263,635 B1 | 7/2001 | Czaplicki | |
| 6,281,260 B1 | 8/2001 | Hanley, IV et al. | |
| 6,292,995 B1 | 9/2001 | Corbin et al. | |
| 6,305,136 B1 | 10/2001 | Hopton et al. | |
| 6,305,430 B1 | 10/2001 | Ishikawa | |
| 6,319,964 B1 | 11/2001 | Blank et al. | |
| 6,347,799 B1 | 2/2002 | Williams et al. | |
| 6,358,584 B1 | 3/2002 | Czaplicki | |
| 6,368,438 B1 | 4/2002 | Chang et al. | |
| 6,382,635 B1 | 5/2002 | Fitzgerald | |
| 6,383,610 B1 | 5/2002 | Barz et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,435,601 B2 | 8/2002 | Takahara | |
| 6,455,146 B1 | 9/2002 | Fitzgerald | |
| 6,467,834 B1 | 10/2002 | Barz et al. | |
| 6,475,577 B1 | 11/2002 | Hopton et al. | |
| 6,478,367 B2 | 11/2002 | Ishikawa | |
| 6,482,486 B1 | 11/2002 | Czaplicki et al. | |
| 6,491,336 B1 | 12/2002 | Beckmann et al. | |
| 6,494,525 B1 | 12/2002 | Blank | |
| 6,520,505 B1 | 2/2003 | Kogler et al. | |
| 6,523,857 B1 | 2/2003 | Hopton et al. | |
| 6,530,187 B2 | 3/2003 | Shimizu | |
| 6,575,526 B2 | 6/2003 | Czaplicki et al. | |
| 6,585,202 B2 | 7/2003 | Broccardo et al. | |
| 6,613,412 B1 | 9/2003 | Dressler | |
| 6,619,727 B1 * | 9/2003 | Barz et al. | 296/187.02 |
| 6,641,208 B2 * | 11/2003 | Czaplicki et al. | 296/187.02 |
| 6,668,457 B1 | 12/2003 | Czaplicki | |
| 6,691,468 B2 | 2/2004 | Helferty | |
| 6,706,222 B2 | 3/2004 | Gallagher et al. | |
| 6,722,720 B2 | 4/2004 | Donick et al. | |
| 6,722,720 B2 | 4/2004 | Yoshida et al. | |
| 6,729,425 B2 | 5/2004 | Schneider et al. | |
| 6,777,049 B2 | 8/2004 | Sheldon et al. | |
| 6,786,533 B2 | 9/2004 | Bock et al. | |
| 6,820,923 B1 | 11/2004 | Bock | |
| 6,880,657 B2 | 4/2005 | Schneider et al. | |
| 6,883,858 B2 | 4/2005 | Barz | |
| 6,890,021 B2 | 5/2005 | Bock et al. | |
| 6,905,745 B2 | 6/2005 | Sheldon et al. | |
| 6,920,693 B2 | 7/2005 | Hankins et al. | |
| 6,926,784 B2 | 8/2005 | Bock | |
| 6,928,736 B2 | 8/2005 | Czaplicki et al. | |
| 6,932,421 B2 | 8/2005 | Barz | |
| 6,953,219 B2 | 10/2005 | Lutz et al. | |
| 6,988,585 B2 | 1/2006 | Mourieras et al. | |
| 7,043,815 B2 | 5/2006 | Lande et al. | |
| 7,090,273 B2 | 8/2006 | Stojkovic et al. | |
| 7,114,763 B2 | 10/2006 | Riley et al. | |
| 7,144,071 B2 | 12/2006 | Le Gall et al. | |
| 7,150,495 B2 | 12/2006 | Fayt et al. | |
| 7,160,491 B2 | 1/2007 | Barz et al. | |
| 7,249,415 B2 | 7/2007 | Larsen et al. | |
| 7,255,388 B2 | 8/2007 | LeGall et al. | |
| 7,267,738 B2 | 9/2007 | Czaplicki et al. | |
| 7,428,774 B2 | 9/2008 | Thomas et al. | |
| 7,469,459 B2 | 12/2008 | Kosal et al. | |
| 7,494,179 B2 | 2/2009 | Deachin et al. | |
| 7,503,620 B2 | 3/2009 | Brennecke et al. | |
| 2001/0001355 A1 | 5/2001 | Shimizu | |
| 2002/0024233 A1 | 2/2002 | Klieno | |
| 2002/0074827 A1 | 6/2002 | Fitzgerald et al. | |
| 2002/0160130 A1 | 10/2002 | Bourdin et al. | |
| 2002/0164450 A1 | 11/2002 | Lupini et al. | |
| 2002/0168614 A1 | 11/2002 | Riley | |
| 2002/0191408 A1 | 12/2002 | Miller | |
| 2003/0051850 A1 | 3/2003 | Asholt et al. | |
| 2003/0090129 A1 | 5/2003 | Riley et al. | |
| 2003/0091806 A1 * | 5/2003 | Staelgraeve et al. | 428/297.4 |
| 2003/0184121 A1 | 10/2003 | Czaplicki et al. | |
| 2004/0011282 A1 | 1/2004 | Myers et al. | |
| 2004/0018341 A1 | 1/2004 | Richardson et al. | |
| 2004/0076831 A1 | 4/2004 | Habel et al. | |
| 2004/0090017 A1 | 5/2004 | Roberts et al. | |
| 2004/0143969 A1 | 7/2004 | Czaplicki et al. | |
| 2004/0217498 A1 | 11/2004 | Ondrus et al. | |
| 2004/0262853 A1 | 12/2004 | Larsen et al. | |
| 2005/0017542 A1 | 1/2005 | Belpaire | |
| 2005/0081383 A1 | 4/2005 | Kosal et al. | |
| 2005/0082111 A1 | 4/2005 | Weber | |
| 2005/0087899 A1 | 4/2005 | Coon et al. | |
| 2005/0102815 A1 | 5/2005 | Larsen | |
| 2005/0126848 A1 | 6/2005 | Sianoshai | |
| 2005/0127145 A1 | 6/2005 | Czaplicki et al. | |
| 2005/0194706 A1 | 9/2005 | Kosal et al. | |
| 2005/0212326 A1 | 9/2005 | Marion | |
| 2005/0212332 A1 | 9/2005 | Sheldon et al. | |
| 2005/0260399 A1 | 11/2005 | Finerman | |
| 2006/0021697 A1 | 2/2006 | Riley et al. | |
| 2006/0043772 A1 | 3/2006 | Richardson | |
| 2006/0061137 A1 | 3/2006 | Stojkovic et al. | |
| 2006/0065330 A1 | 3/2006 | Cooper et al. | |
| 2006/0090343 A1 | 5/2006 | Riley et al. | |
| 2006/0152027 A1 | 7/2006 | Stojkovic et al. | |
| 2007/0018483 A1 | 1/2007 | Kerscher et al. | |
| 2007/0080559 A1 | 4/2007 | Stolarski et al. | |
| 2007/0087848 A1 | 4/2007 | Larsen et al. | |

FOREIGN PATENT DOCUMENTS

| | | |
|---|---|---|
| DE | 1 972 79 07 A1 | 5/1998 |
| EP | 0 360 214 A2 | 3/1990 |
| EP | 0 679 501 A1 | 11/1995 |
| EP | 0 697 956 B1 | 2/1996 |
| EP | 0 891 918 A1 | 1/1999 |
| EP | 1 134 126 B1 | 3/2001 |
| EP | 1 126 001 A2 | 8/2001 |
| EP | 1 031 496 B1 | 12/2001 |
| EP | 1 182 087 A2 | 2/2002 |
| EP | 1 362 683 | 11/2003 |
| EP | 1 362 683 A2 | 11/2003 |
| EP | 1 435 320 B1 | 11/2007 |
| GB | 2 083 162 A | 3/1982 |
| GB | 2 304 651 A | 3/1997 |
| GB | 2 325 509 A | 11/1998 |
| JP | 56-118816 A | 9/1981 |
| JP | 2-206537 A | 8/1990 |
| JP | 3-197743 | 8/1991 |
| JP | 3-197743 B2 | 8/1991 |
| JP | 4-158009 A | 6/1992 |
| JP | 10-45031 | 2/1998 |
| JP | 10-045031 A | 2/1998 |
| JP | 10-053156 A | 2/1998 |
| JP | 10053156 | 2/1998 |
| JP | 10-71628 | 3/1998 |
| JP | 10-071628 A | 3/1998 |
| JP | 2000-52444 | 2/2000 |
| JP | 2000-052444 A | 2/2000 |
| JP | 2001-062833 A | 3/2001 |
| JP | 2002-62833 | 3/2001 |
| JP | 2002-331960 | 11/2002 |

| | | |
|---|---|---|
| JP | 2002331960 | 11/2002 |
| JP | 2002-362412 | 12/2002 |
| JP | 2002-362412 A | 12/2002 |
| WO | 98/50221 A1 | 5/1998 |
| WO | WO98/50221 | 5/1998 |
| WO | 99/08854 A1 | 2/1999 |
| WO | WO99/08854 | 2/1999 |
| WO | 00/03894 A1 | 1/2000 |
| WO | WO00/03894 | 1/2000 |
| WO | 00/38863 A1 | 7/2000 |
| WO | WO00/38863 | 7/2000 |
| WO | 01/19667 A1 | 3/2001 |
| WO | WO01/19667 A1 | 3/2001 |
| WO | 01/54936 A1 | 8/2001 |
| WO | WO01/54936 | 8/2001 |
| WO | 01/71225 A1 | 9/2001 |
| WO | WO01/71225 | 9/2001 |
| WO | 01/83206 A1 | 11/2001 |
| WO | 01/88033 A1 | 11/2001 |
| WO | WO01/83206 | 11/2001 |
| WO | WO 01/88033 | 11/2001 |
| WO | 03/051676 A1 | 6/2003 |
| WO | WO03/051676 | 6/2003 |
| WO | 2005/044630 A1 | 5/2005 |
| WO | WO2005/044630 | 5/2005 |

OTHER PUBLICATIONS

Lilley et al., A Comparison of NVH Treatments for Vehicle Floorplan Applications.
Lilley et al., Vehicle Acoustic Solutions.
Copending U.S. Appl. No. 10/718,509, filed Nov. 20, 2003.
Copending U.S. Appl. No. 10/761,635, filed Jan. 21, 2004.
Copending U.S. Appl. No. 10/839,084, filed May 5, 2004.
Copending U.S. Appl. No. 10/806,309, filed Mar 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 10/920,520, filed Aug. 18, 2004.
Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 10/873,935, filed Jun. 22, 2004.
Copending U.S. Appl. No. 11/115,668, filed Apr. 27, 2005.
Copending U.S. Appl. No. 60/675,581, filed Apr. 28, 2005.
Copending U.S. Appl. No. 60/676,406, filed Apr. 29, 2005.
Copending U.S. Appl. No. 60/680,268, filed May 12, 2005.
Copending U.S. Appl. No. 60/674,919, filed Apr. 26, 2005.
Baffle Part Disclosure, Figure 1, Nov. 2002, 3 pages.
Copending U.S. Appl. No. 60/592,691, filed Jul. 30, 2004.
Copending U.S. Appl. No. 60/623,099, filed Oct. 28, 2004.
Copending U.S. Appl. No. 10/927,349, filed Aug. 26, 2004.
Copending Patent Application No. GB0220945.0 filed Sep. 10, 2002.
Copending Patent Application No. EP0300159.1 filed Jan. 6, 2003.
Lilley et al., Comparison of Preformed Acoustic Baffles and Two-Component Polyurethane Foams for Filling Body Cavities, From: Proceedings of the 2001 Noise and Vibration Conference, Apr. 30-May 3, 2001, SAE Technical Paper Series 2001-01-1460.
Lilley et al., A Comparison of NVH Treatments for Vehicle Floorpan Applications, From: Proceedings of the 2001 Noise and Vibration Conference, Apr. 30-May 3, 2001, SAE Technical Paper Series 2001-01-1464.
Lilley et al., Vehicle Acoustic Solutions, Noise and Vibration Conference and Exhibition. May 5-8, 2003, SAE Technical Paper Series 2003-01-1583.
Born et al., Structural Bonding in Automotive Applications, Auto Technology, Apr. 2004, 44-47.
Hopton et al., Application of Structural Reinforcing Material to Improve Vehicle NVH Characteristics, From: 1999 IBEC Proceedings CD-Rom, Sep. 28-30, 1999, SAE Technical Paper Series 1999-01-3223.
Mansour et al., Optimal Bonding Thickness for Vehicle Stiffness, From: Proceedings of the 2001 Noise and Vibration Conference, Apr. 30-May 3, 2001, SAE Technical Paper Series 2001-01-1469.

\* cited by examiner

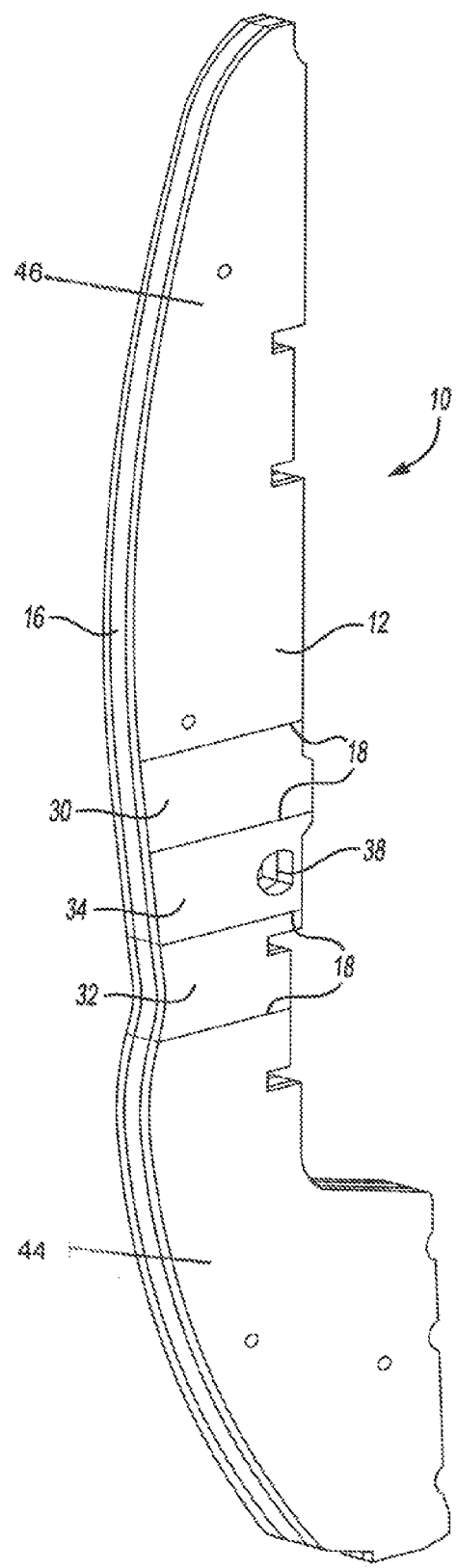

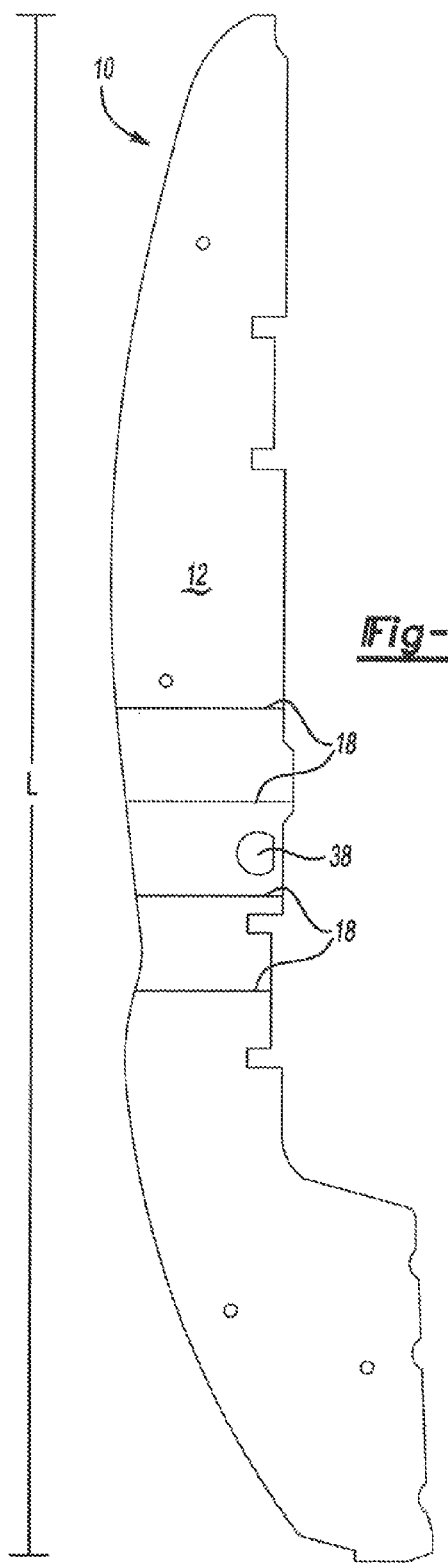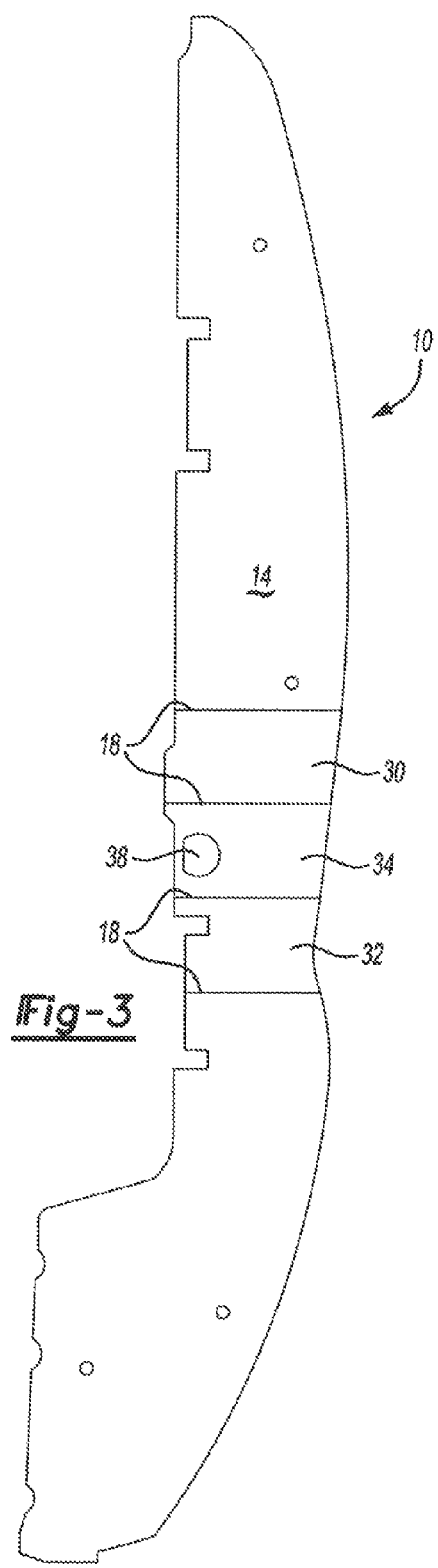

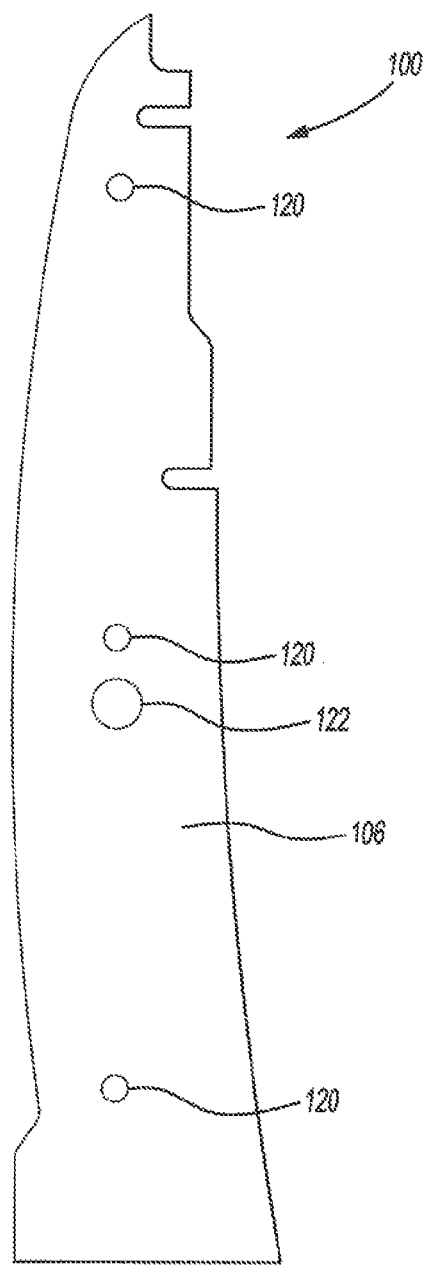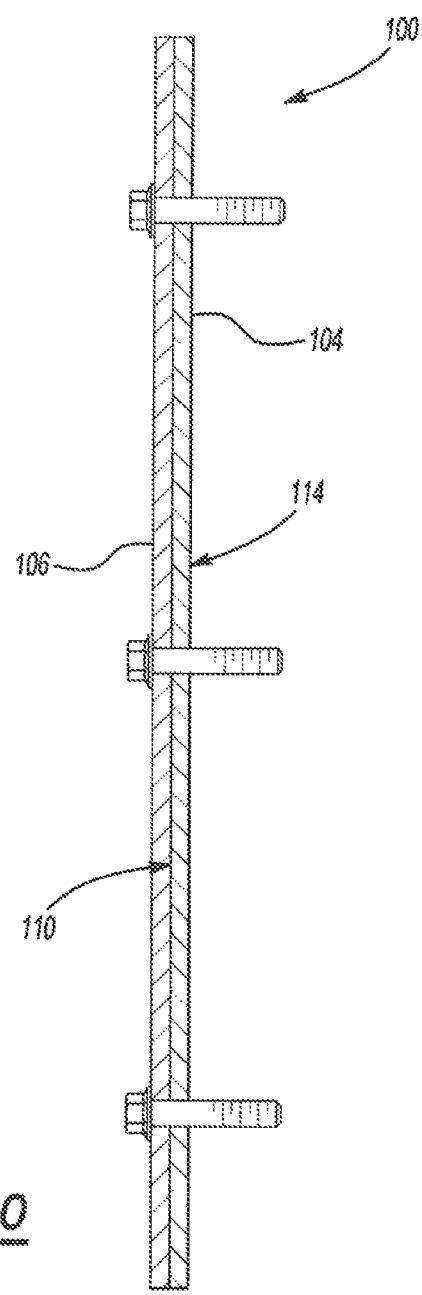

BAFFLE FOR AN AUTOMOTIVE VEHICLE AND METHOD OF USE THEREFOR

CLAIM OF PRIORITY

The present application is a continuation-in-part of application Ser. No. 11/136,742 filed on May 25, 2005 and the present application claims the benefit of the filing date of the prior application."

FIELD OF THE INVENTION

The present invention relates generally to an insert or baffle for an automotive vehicle and more particularly to a baffle designed to accommodate one or more components of the automotive vehicle.

BACKGROUND OF THE INVENTION

With the proliferation of new vehicle designs, it has become increasingly difficult to design baffles for minimization of sound transmission to automotive vehicle interior passenger compartments. New vehicle designs can create cavities that are difficult for baffles to seal because of the shape, location, size or the like of the cavities. Additionally, such cavities can be difficult to access, which, in turn, can cause difficulties for assembling baffles to the vehicles. New vehicle designs can also cause vehicle components such as fasteners or other components to be positioned in different locations within a vehicle and, as a consequence, baffles may have to be designed to accommodate such components while still being able to effectively seal or baffle components or cavities for minimizing sound transmission. As one example, it can be particularly difficult to design baffles to seal cavities between a forward body panel (e.g., a front quarter or fender panel) and an A-pillar of an automotive vehicle (e.g., a pick-up truck), particularly when the body panel is connected to the A-pillar with one or more fasteners.

The present invention provides a baffle for addressing one or more of the difficulties discussed above.

SUMMARY OF THE INVENTION

Accordingly, there is provided a baffle having one or more carrier layers and a layer of expandable material that is preferably substantially coextensive with the one or more carrier layers. Typically, the baffle has opening for receiving one or more fasteners designed to assist in desirably locating the baffle in a cavity of a structure of an automotive vehicle. The baffle also typically includes an additional opening (e.g., a through-hole) for accommodating a component of the automotive vehicle. In one preferred embodiment, the opening is suitable for allowing a bolt to be extended through the opening.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of an exemplary baffle in accordance with an aspect of the present invention.
FIG. 2 is a front view of the exemplary baffle of FIG. 1.
FIG. 3 is a rear view of the exemplary baffle of FIG. 1
FIG. 9 is a front view of another exemplary baffle in accordance with aspects of the present invention.
FIG. 10 is a side view of the exemplary baffle of FIG. 9.

DETAILED DESCRIPTION OF THE PREFERRED EMBODIMENT

Figure 4:
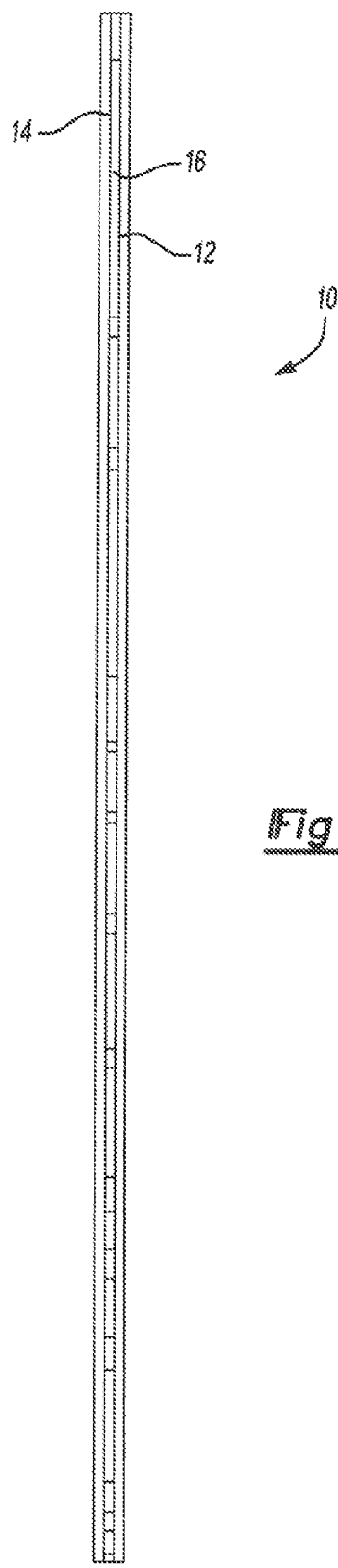
FIG. 4 is a side view of the exemplary baffle of FIG. 1.

The present invention is predicated upon providing an improved system for sealing and baffling a cavity of an automotive vehicle. The baffle typically includes one or more of the following:
1) at least one carrier member (e.g., carrier layers); and
2) a layer of expandable material at least partially disposed upon the one or more carrier members.

Referring to FIGS. 1-5, there is illustrated an exemplary baffle 10 formed in accordance with the present invention. The baffle 10 includes a first carrier layer 12, a second carrier layer 14 and a layer 16 of expandable material. The first carrier layer 12 opposes the second carrier layer 14 and is substantially coextensive therewith.

Each of the carrier layers 12, 14 include a plurality of bend locations 18. As used herein, unless otherwise stated, bend locations include actual bends of the carrier layer or deformations (e.g., scores, grooves, indents, markings, combination thereof or the like) which indicate locations that are bent when the baffle 10 is installed in an automotive vehicle. In the particular embodiment shown, each of the carrier layers 12, 14 include four bend locations 18 and the four bend locations 18 of the first carrier layer 12 are opposite the four bend locations 18 of the second carrier layer 14.

The first carrier layer 12 may be made of the same material or a different material than the second carrier layer 14. Typically, the layers 12, 14 are made of flexible materials such as fabrics, fibrous materials, plastic films or the like. In one preferred embodiment, both of the carrier layers 12, 14 are formed of flexible metal foil. However, it is also contemplated that the carrier layers could be formed of more rigid materials such as molded or otherwise formed thermoplastics (e.g., polyamide), metal stampings, molded thermosets, composites, metal foam or the like.

In the embodiment shown, the layer 16 of expandable material is sandwiched between the first carrier layer 12 and the second carrier layer 14 for forming the baffle 10. The layer 16 of expandable material is substantially coextensive with the first carrier layer 12 and the second carrier layer 14.

The first carrier layer 12, the second carrier layer 14 and the layer 16 of expandable material and therefore, the baffle 10, each include a length (L) with a tapered upper end and a tapered lower end. Advantageously, at a central area of the baffle 10, the plurality of bend locations 18 are bent or can be bent to define an upper panel portion 30, a lower panel portion 32, and a central panel portion 34 in the baffle 10.

The baffle 10 also typically includes at least one opening (e.g., a cavity, a through-hole or the like) for accommodating a component (e.g., a fastener or other elongated member) of an automotive vehicle. In FIGS. 1-4, a through-hole 38 extends through the carrier layers 12, 14 and the layer 16 of expandable material. In the embodiment shown, the through-hole 38 extends through the central panel portion 34 of the baffle 10.

A plurality of fasteners 40 extend through the baffle 10. In the illustrated embodiment each of the plurality of fasteners 40 is a plastic push pin that extends through the first carrier layer 12, the layer 16 of expandable material and the second carrier layer 14. As shown, two of the plurality of fasteners 40 extend through a lower portion 44 of the baffle 10. One of the fasteners 40 extends through the baffle 10 adjacent the upper panel portion 30. Finally, one of the fasteners 40 extends through an upper portion 46 of the baffle 10.

Preferably, the expandable material is a heat activated material having foamable characteristics. The material may be generally dry to the touch or tacky and can be located upon or between one or more carrier layers in any form of desired pattern, placement, or thickness, but typically has a substantially uniform thickness. Exemplary expandable materials include L-5248, L-7002 and L-5204 foams available through L&L Products, Inc. of Romeo, Mich.

Though other heat activated materials are possible for the expandable material, a preferred heat activated material is an expandable plastic, and preferably one that is foamable. Particularly preferred materials are an epoxy-based and EVA (Ethylene Vinyl Acetate) based structural, sealing, baffling or sound-absorbing foams. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of reinforcing, sealing and/or baffling foams are known in the art and may also be used to produce foam. A typical foam includes a polymeric base material, such as an epoxy resin, an ethylene-based polymer, an acrylate and/or acetate based material or a combination thereof which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link or thermoset upon curing, which makes the material incapable of further flow.

Examples of preferred foam formulations are EVA based and epoxy-based materials that are commercially available from L&L Products of Romeo, Mich., under the designations L5206, L5207, L5208, L5209, L5218, L5224, L-5248, XP321 and XP721. One advantage of the preferred foam materials over prior art materials is that the preferred materials can be processed in several ways. The preferred materials can be processed by injection molding, extrusion, compression molding, application with a mini-applicator, pelletization of the like. This enables the formation and creation of part designs that exceed the capability of most prior art materials. In one preferred embodiment, the structural foam (in its uncured state) is generally is dry or relatively free of tack to the touch, though in some applications tacky material can be used.

While the preferred materials for fabricating the expandable material have been disclosed, the material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755, 486; 5,575,526; and 5,932,680, (incorporated by reference). In general, it is desirable for the expandable material to have good corrosion resistance properties.

It can also be desirable for the expandable material of the present invention to be a relatively high expansion material that also exhibits self supporting characteristics. Such an expandable material can be activated to a volume greater than its volume in the unexpanded state (e.g., 800% greater, 1000% greater, 1200% greater, 1500% greater, 1700% greater, 2000% greater, 2500% greater, 3000% greater, 3500% greater or higher). To provide a material that can exhibit both high expansion and self supporting characteristics, particular ingredients can be included in the material. In particular, the material will typically includes one or more base polymer materials, which can include one or more acrylates, one or more acetates or a combination thereof. The expandable material can also include a fibrous filler material such as an aramid pulp. The expandable material can also include a lower temperature curing agent that cures the polymer materials at a temperature of between about 60° C. and about 110° C. Such a curing agent will typically be employed in conjunction with a higher temperature curing agent as well. The expandable material may also include a tackifier such as a hydrocarbon tackifier with one or more degrees of unsaturation and/or a small amount of epoxy resin. An expandable material with embodiments that exhibit relatively high expansion and self supporting characteristics is disclosed in commonly owned U.S. Pat. No. 7,199,165, incorporated herein by reference for all purposes.

In applications where the expandable material is a heat activated, thermally expanding material, an important consideration involved with the selection and formulation of the material comprising the foam is the temperature at which a material reaction or expansion, and possibly curing, will take place. For instance, in most applications, it is undesirable for the material to be reactive at room temperature or otherwise at the ambient temperature in a production line environment. More typically, the expandable material becomes reactive at higher processing temperatures, such as those encountered in an automobile assembly plant, when the foam is processed along with automobile components at elevated temperatures or at higher applied energy levels, e.g., during painting preparation steps or during e-coat or paint baking. While temperatures encountered in an automobile assembly (e-coat or paint bake) operation may be in the range of about 148.89° C. to 204.44° C. (about 300° F. to 400° F.), body and paint shop applications are commonly about 93.33° C. (about 200° F.) or higher. If needed, blowing agent activators can be incorporated into the composition to cause expansion at different temperatures outside the above ranges or expansion at different rates or to different degrees.

Generally, suitable expandable foams have a range of expansion ranging from approximately 0 to over 1000 percent. The level of expansion of the expandable material may be increased to as high as 1500 percent or more. In still other embodiments, it is contemplated that the expandable material expands to at least 2000%, 2500%, 3000% or more relative to its original non-expanded size. Typically, strength is obtained from products that possess low expansion while baffling and/or sound absorption is obtained through greater expansion.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen container or structure, and applying it thereto.

Installation or assembly of the baffle typically involves placement, either manually, automatically or a combination thereof, within a cavity of an automotive vehicle. Thereafter, the layer of expandable material is expanded to expand (e.g., foam) and wet, and adhere to walls defining the cavity. Upon curing, the baffle forms a layer of foam that substantially entirely seals a cross-section of the cavity for inhibiting the transmission of sound and/or other material or debris through the cavity.

In FIGS. 5-8, the baffle 10 is assembled to an automotive vehicle particularly shown as a pick-up truck 60, although other transportation vehicles are possible as well. As can be seen, the baffle 10 is placed in a cavity 62 that is substantially defined by a forward outer body panel 66 (i.e., also referred to as a front fender panel or front quarter panel) of the truck 60 and a pillar 70 (e.g., an A-pillar or hinge pillar) of the vehicle.

During installation, the bend locations 18 may be bent or may be pre-bent such that the upper panel portion 30 and the lower panel portion 32 extend to the central panel portion 34. As a result, the central portion 34 is recessed relative to at least a substantial portion of the rest of the baffle 10.

Typically, assembly of the baffle 10 to the vehicle includes placement of the baffle 10 within the cavity 62 and attachment of the fasteners 40 (e.g., push pins) to flanges 72 that are attached to the panel 66, the pillar 70 or both.

During further assembly of the vehicle, a fastener 76 (shown as a nut and bolt assembly or just a bolt) is received in and/or extended through the opening or through-hole 38 located in the central panel portion of the baffle. In the embodiment shown, at least a portion of the nut and bolt assembly or just the bolt (e.g., the nut, the bolt, the head of the bolt or a combination thereof) is extended through the baffle.

The nut and bolt assembly or just the bolt 76 typically connects the forward body panel 66 of the vehicle to the hinge or A-pillar 20 of the vehicle. In the particular embodiment illustrated, the fastener 38 is fastened to a flange 80 attached to the forward body panel 66 and to a flange 82 attached to the hinge A-pillar 20. Generally, it is contemplated that the bolt 76 may be partially extended through the opening 38 such that a portion of the bolt 76 remains in the opening 38 or the bolt 76 may be fully extended through the opening 38 such that none of the bolt 76 remains in the opening 38.

Preferably, upon exposure to an elevated temperature, typically in an e-coat oven or paint oven, the baffle 10 and particularly the expandable material of the baffle 10 is activated and expands (e.g., foams) to substantially span, baffle and seal a cross-section of the cavity 62 for forming a baffling system 90 that inhibits the transmission of sound and/or other material or debris through the cavity 62.

If a portion of the fastener 76 remains in the opening 38 prior to expansion of the expandable material, the layer 16 of expandable material can advantageously wet, adhere and seal about the fastener 38 (i.e., the nut, the bolt, the head of the bolt or a combination thereof) for inhibiting the transmission of sound or debris about the fastener 38. Alternatively, if the fastener 26 is extended substantially entirely through the opening 38 such that only a small portion or no portion of the fastener 76 remains in the opening 38, the expandable material can advantageously expand across the entirety of the opening 38 such that the baffle 10 remains effective at providing baffling to the cavity. It is also contemplated that, even though no portion of the fastener 76 or only a small portion or the fastener may remain in the opening 38, it is possible that the expandable material could expand outwardly from within the opening 38 to wet, contact and adhere to a portion of the fastener 76 (e.g., a head of the bolt). Advantageously, in such an embodiment, the expandable material, once expanded and cured can assist in damping vibrations of the fastener 76.

In an embodiment shown in FIGS. 9 and 10, there is illustrated a baffle 100 having a carrier member 104 with an expandable material 106 disposed thereof. As shown, the expandable material 106 is disposed over substantially the entirety of a surface 110 of the carrier member 104 with the opposing surface 114 of the carrier member 104 being substantially free of expandable material 106. Like the previous embodiments, the baffle includes openings with fasteners 120 extending therethrough and an opening 122 (e.g., cavity or through-hole) for accommodating a component (e.g., a bolt) as is previously described. It is also contemplated that the baffle 100 can include any of the features (e.g., bend locations) described with respect to previous embodiments and vice versa. Further, it is contemplated that the heads of the fasteners may be located at least partially beneath the expandable material as opposed to how their shown.

The baffle 100 includes only one a carrier member 104 and is, therefore, without a second carrier member sandwiching the expandable material therebetween. In such an embodiment, it can be particularly desirable to use the higher expansion and/or self supporting expandable material described herein.

The carrier member 104 can be formed of any of the materials discussed herein. In one particular embodiment, the carrier member 104 is a metal sheet material (e.g., steel such as stainless steel shimstock, a shimstock with a corrosion resistant coating, hardened tempered aluminum material or shimstock, combinations thereof or the like). It is preferable for the carrier member 104 to having a thickness of at least about 0.01 mm (millimeter), more typically at least about 0.05 mm and even more typically at least about 0.08 mm. It is also typical for the carrier member to have a thickness of less than about 1 mm, more typically less than about 0.4 mm and even more typically less than about 0.25 or 0.2 mm and even possibly less than about 0.13 mm. The expandable material 106 is typically layered upon the carrier member 104 with a thickness of at least about 0.8 mm (millimeter), more typically at least about 1.1 mm and even more typically at least about 1.3 mm. It is also preferable for the carrier member to have a thickness of less than about 3.0 mm, more typically less than about 2.0 mm and even more typically less than about 1.7 mm.

Figure 5:
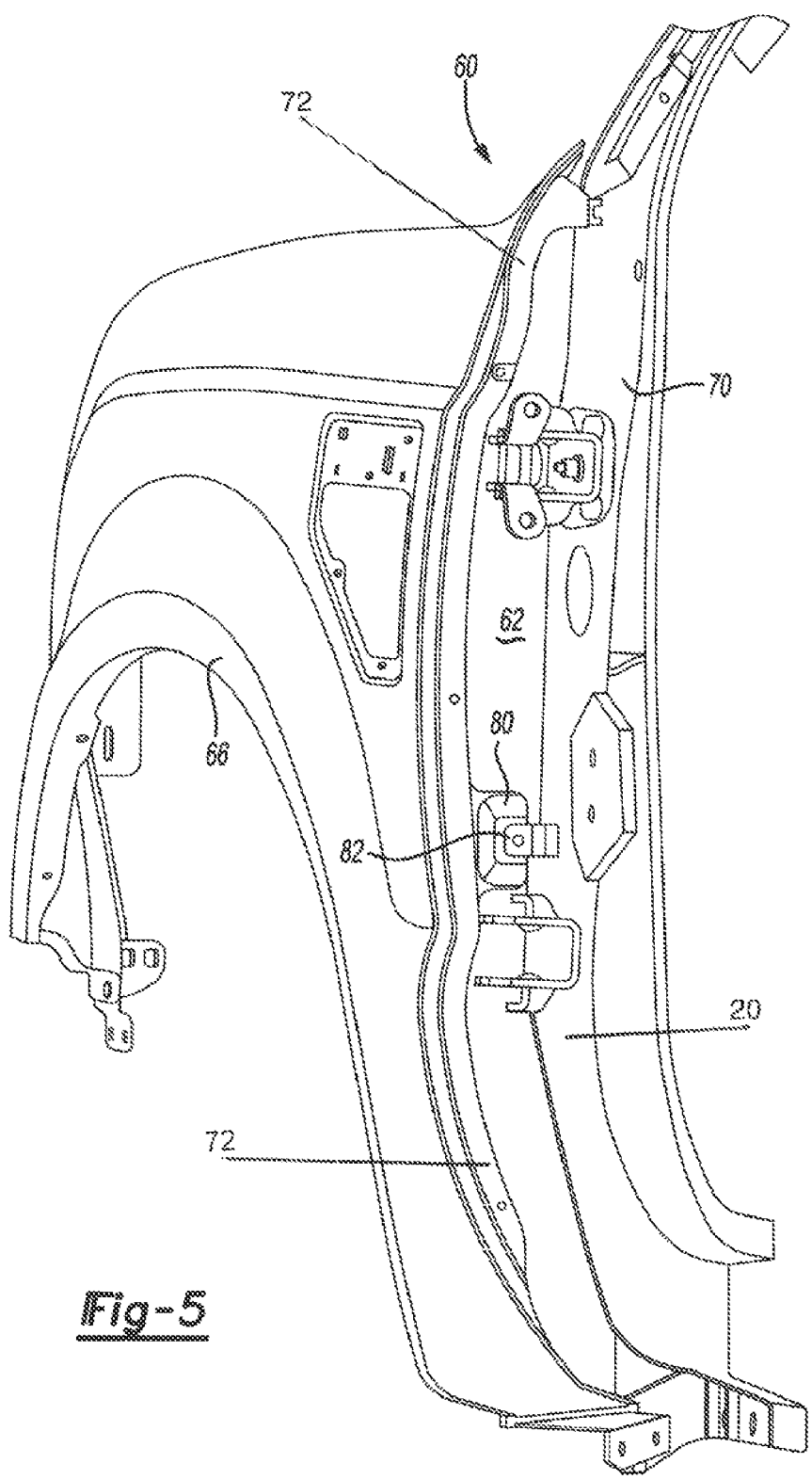
FIG. 5 is a rear view of a portion of an automotive vehicle prior to assembly of the exemplary baffle of FIGS. 1-4.
Figure 6:
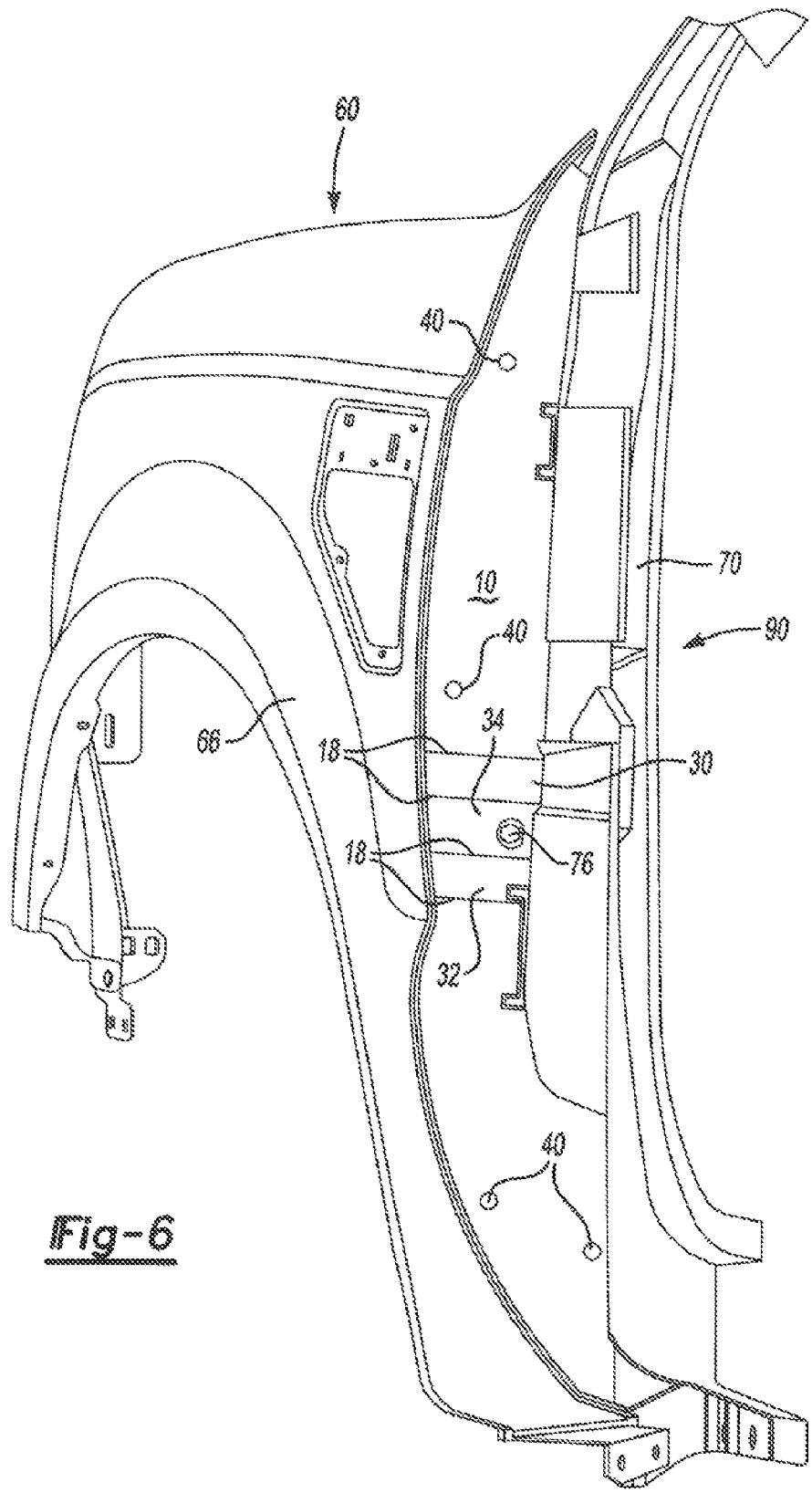
FIG. 6 is a rear view of the portion of the automotive vehicle after assembly of the exemplary baffle of FIGS. 1-4.
Figure 7:
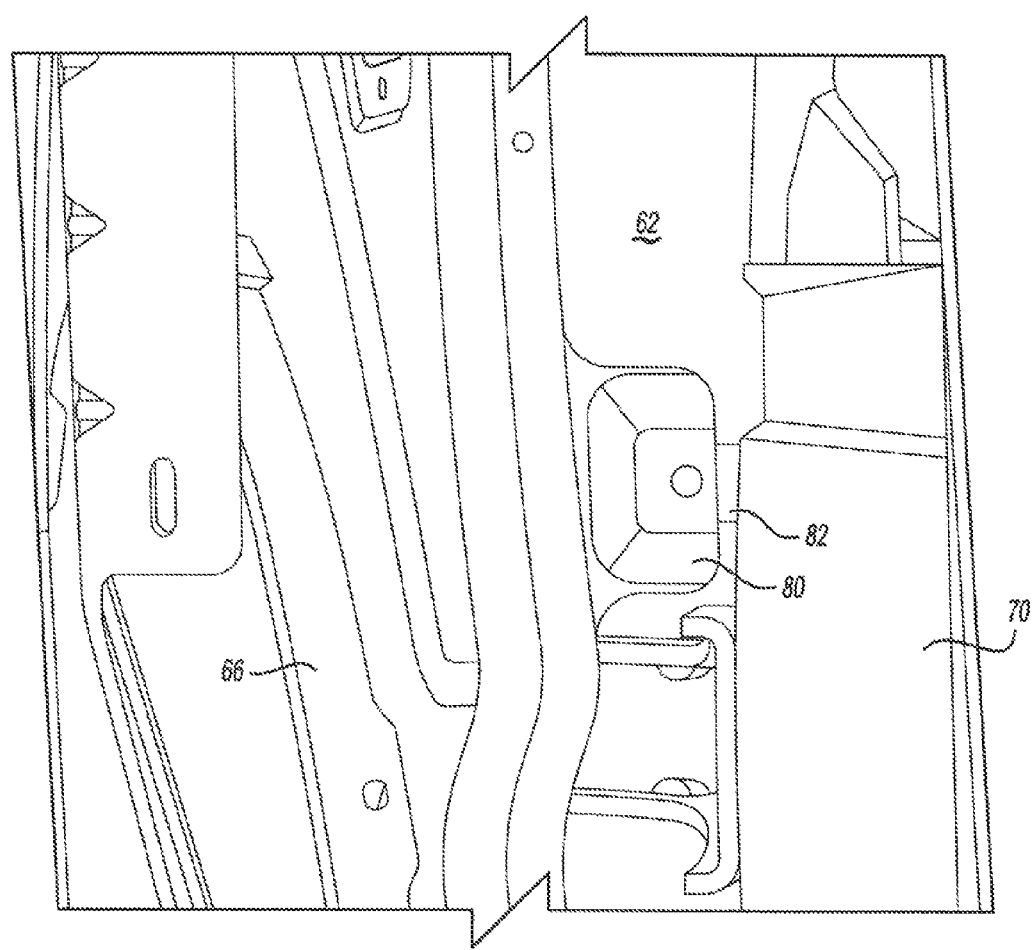
FIG. 7 is a close up view of a portion of an automotive vehicle prior to assembly of the exemplary baffle of FIGS. 1-4.
Figure 8:
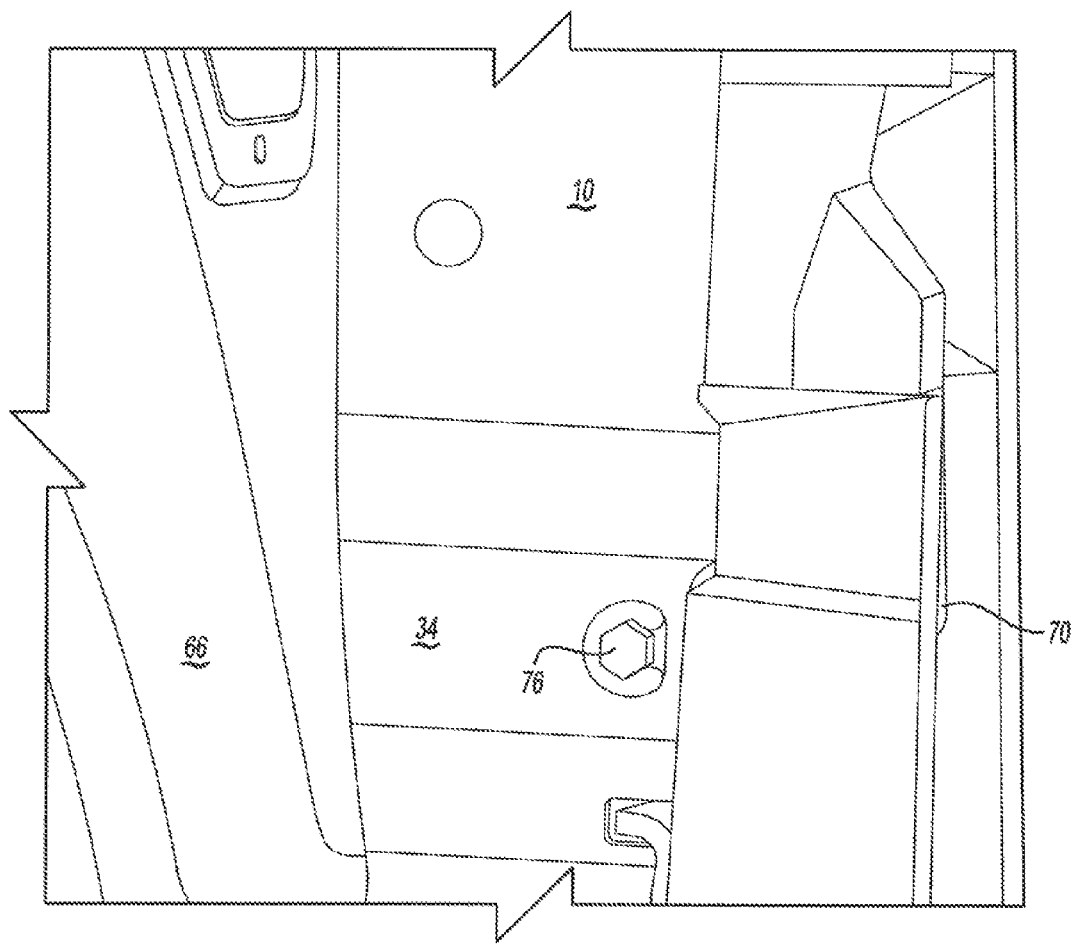
FIG. 8 is a close up view of the portion of the automotive vehicle after assembly of the exemplary baffle of FIGS. 1-4.

The baffle 100 can be located within a cavity (e.g., adjacent the outer body panel and a vehicle pillar) in the same manner as that shown in FIGS. 5 and 6. Upon location in the cavity, particularly a cavity adjacent a front fender of the vehicle, the expandable material can be facing toward the front of the vehicle or the rear of the vehicle. In the embodiment of FIGS. 5 and 6, it faces toward the rear of the vehicle. After location in the cavity, the expandable material 106 can be activated to expand and adhere to the walls and surfaces defining the cavity about the periphery of the baffle 10 as described for the other baffle herein. The expandable material 106 can also expand across the opening 122 as is also described with respect to the other baffles. Advantageously, this expandable material, due to its higher expansion and/or self supporting characteristics, can effectively expand to and adhere to surfaces defining the cavity without needing an opposing carrier member and without having to locate the expandable material upon the carrier member in a specialized manner.

The baffle of the present invention, particularly when used with a relatively high expanding expandable material, has been found to be particularly desirable for baffling and/or sealing larger cavities. As such, it can be desirable for surfaces, such as opposing surface 110 and/or opposing surface 114, of the carrier member of the baffle to have relatively large surface areas. When such surface areas are employed, they are typically at least about 300 cm$^2$, more typically at least about 600 cm$^2$ and even possibly at least 800 or 900 cm$^2$. Such surfaces areas are typically less than about 5000 cm$^2$, more typically less than about 2500 cm$^2$.

While the use of fasteners for at least temporarily locating the baffle in a cavity is typically desirable, it is contemplated that the carrier member could be provided with tabs (e.g., metal tabs) that can be used to weld the baffle into a desired position within the cavity. Moreover, the baffle, and particularly the carrier member of the baffle, could be fitted with one or more metal brackets for assisting in, for example, locating the baffle in a cavity, providing the baffle with a configuration more suitable for location within a cavity, fastening the baffle in a cavity or the like. Such brackets can, for example, bend themselves or bend the carrier member to position the baffle in the cavity.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of providing baffling to a cavity of an automotive vehicle, comprising:
   providing a baffle, the baffle having:
      a flexible thermoplastic carrier member including a substantially planar portion having a upper portion and lower portion, the flexibility of the carrier being sufficient so that the carrier is capable of being bent at one or more bend locations during installation of the carrier into the cavity; wherein said one or more bend locations include scores, grooves, indents, markings or a combination thereof;
      an expandable material layered over a portion of the carrier member such that the expandable material is located along at least the periphery of the carrier member;
      three or more openings located along the carrier member for receiving a push-pin fastener, at least one opening located in the upper portion of the carrier member, at least one opening located in the lower portion of the carrier member, and at least one opening located adjacent an upper panel portion;
      an opening for receiving a bolt, the opening:
         (i) being located within a central panel portion of the baffle; and
         (ii) including a portion of the expandable material located about the periphery of the opening.

2. A method as in claim 1 wherein the cavity of the vehicle is at least partially defined by a fender panel of the vehicle, a hinge or A pillar of the vehicle or both.

3. A method as in claim 1 wherein the expandable material is substantially tack-free to the touch.

4. A method as in claim 1 wherein the baffle includes a length with a tapered upper end and a tapered lower end.

5. A method as in claim 1 wherein the baffle includes one or more fasteners for at least temporarily securing the baffle in the cavity of the structure of the automotive vehicle and wherein the one more fasteners include mechanical interference fitting fasteners.

6. A method as claim 5 wherein the fasteners are extended through the opening in the baffle and employed to connect a fender of the vehicle to an A-pillar of the vehicle and wherein the expandable material expands upon exposure to an elevated temperature in an e-coat or paint oven.

7. A method as in claim 5 the expandable material includes at least one or any combination of a fibrous material, a tackifier and a lower temperature curing agent.

8. A method as its claim 1 wherein the automotive vehicle is a pick-up truck, an SUV (sport utility vehicle), a sedan or a cross-over vehicle.

9. A method as is claim 1 further comprising passing a fastener at least partially, substantially entirely or entirely through the opening for receiving the bolt of the baffle.

10. A method as in claim 9 wherein the expansion of the expandable material seals the opening for receiving the bolt of the baffle wherein the expandable material either expands to:
   i. seal about the fastener;
   ii. contact and adhere to the fastener; or
   iii. expand across the entirety of the opening of the baffle.

11. A method of providing baffling to a cavity of an automotive vehicle, comprising:
   providing a baffle having a carrier member and an expandable material located over a portion of the carrier member wherein:
   i. the carrier member is formed of a flexible thermoplastic material and includes an upper portion and a lower portion, the flexibility the carrier being sufficient so that the carrier is capable of being bent at one or more bend locations during installation of the carrier into the cavity; wherein said one or more bend locations include scores, grooves, indents, markings or a combination thereof;
   ii. the expandable material includes at least one of a fibrous material, a tackifier and a lower temperature curing agent;
   iii. the carrier member is provided as a layer;
   iv. the carrier member includes three or more openings located along the carrier member for receiving a push-pin fastener, at least one opening located in the upper portion of the carrier member, at least one opening located in the lower portion of the carrier member, and at least one opening located adjacent an upper panel portion;

v. the carrier member includes an opening for receiving a bolt, the opening being located within a central panel portion of the baffle and including a portion of the expandable material located about the periphery of the opening.

12. A method as claim 11 wherein the baffle includes multiple bend locations.

13. A method as in claim 11 the plurality of bend locations define an upper panel portion, a lower panel portion, and a central panel portion in the baffle.

14. A method as is claim 11 further comprising passing a fastener at least partially, substantially entirely or entirely through the opening of the baffle.

15. A method as in claim 11 wherein the expansion of the expandable material seals the opening for receiving the bolt of the baffle wherein the expandable material either expands to:

i. seal about the fastener;
ii. contact and adhere to the fastener; or
iii. expand across the entirety of the opening of the baffle.

* * * * *